(12) United States Patent
Makino

(10) Patent No.: US 7,444,653 B2
(45) Date of Patent: Oct. 28, 2008

(54) DISC UNIT AND DAMPER MECHANISM THEREFOR

(75) Inventor: Takeshi Makino, Fukui (JP)

(73) Assignee: Orion Electric Co., Ltd., Takefu, Fukui (JP)

( * ) Notice: Subject to any disclaimer, the term of this patent is extended or adjusted under 35 U.S.C. 154(b) by 431 days.

(21) Appl. No.: 11/079,828

(22) Filed: Mar. 14, 2005

(65) Prior Publication Data

US 2005/0210489 A1 Sep. 22, 2005

(30) Foreign Application Priority Data

Mar. 16, 2004 (JP) .............................. 2004-074934

(51) Int. Cl.
*G11B 33/14* (2006.01)
*G11B 33/08* (2006.01)

(52) U.S. Cl. ...................................... 720/692; 720/651

(58) Field of Classification Search ......... 720/692–694, 720/651; 369/247.1, 248; 360/97.02
See application file for complete search history.

(56) References Cited

U.S. PATENT DOCUMENTS

| | | | |
|---|---|---|---|
| 4,880,214 A * | 11/1989 | Sukai .......................... | 267/136 |
| 5,737,304 A * | 4/1998 | Soga et al. .................. | 720/692 |
| 5,768,249 A * | 6/1998 | Ro et al. ..................... | 720/698 |
| 6,045,113 A * | 4/2000 | Itakura ....................... | 248/635 |
| 6,741,544 B1 * | 5/2004 | Masaki et al. ............... | 720/702 |
| 6,823,527 B2 * | 11/2004 | Liao et al. ................... | 720/692 |
| 6,859,933 B2 * | 2/2005 | Park et al. ................... | 720/651 |
| 6,934,961 B2 * | 8/2005 | Itakura ....................... | 720/692 |
| 7,120,920 B1 * | 10/2006 | Maeda ........................ | 720/692 |
| 7,243,359 B2 * | 7/2007 | Saito et al. .................. | 720/692 |
| 2003/0012120 A1 * | 1/2003 | Chen et al. .................. | 369/247 |
| 2005/0044558 A1 * | 2/2005 | Santo et al. ................. | 720/616 |
| 2006/0048175 A1 * | 3/2006 | Guo et al. ................... | 720/694 |

FOREIGN PATENT DOCUMENTS

| | | |
|---|---|---|
| JP | 10-047401 | 2/1998 |
| JP | 11-016336 | 1/1999 |
| JP | 2000-291739 | 10/2000 |

* cited by examiner

*Primary Examiner*—Andrea Wellington
*Assistant Examiner*—Matthew G Kayrish
(74) *Attorney, Agent, or Firm*—Flynn, Thiel, Boutell & Tanis, P.C.

(57) ABSTRACT

Disc unit having a small number of parts and capable of effecting fitting operation with ease. A chassis is fitted via elastic members to a holder which is disposed to be moveable vertically with respect to the plane of a body frame. Each elastic member is a substantially cylindrical body having flange portions at the upper and lower end portions thereof. Further, each elastic member includes a pair of first fitting portions disposed adjacent to the inner sides of the flange portions. In addition, each elastic member includes a pair of expansion portions characterized by large diameter and disposed between the first fitting portions. The holder has supporting portions provided with a holder interface formed to fit into the first fitting portions of each elastic member. The chassis has a front holding interface formed to fit into the second fitting portion of each elastic member.

4 Claims, 7 Drawing Sheets

DISC UNIT AND DAMPER MECHANISM THEREFOR

FIELD OF THE INVENTION

The invention relates to a disc unit for reading via a pickup mechanism information stored in a disc such as a CD (Compact Disk), a DVD (Digital Versatile Disk) and the like.

BACKGROUND OF THE INVENTION

A pickup mechanism may be fitted to a disc unit by way of a vibration isolation mechanism such as a damper that is configured to reduce the transmission of vibration to the disc unit. For example, a first patent document, i.e. JP 11-16336 A discloses a damper provided on a strut in which the damper is configured to absorb lengthwise vibrations generated in the strut and otherwise transmitted to a chassis. Further, a second patent document, i.e. JP 2000-291739 A discloses a vibration isolating support unit provided with a damper having a hollow expansion portion and a holding portion configured to couple to the side of a chassis, the support unit further provided with a supporting body configured for insertion into the damper for positioning of the damper with respect to the chassis. Still further, a third patent document, i.e. JP 10-47401 A discloses a vibration isolation unit including a hollow rubber damper having a fitting portion provided between an upper extension portion and a lower extension portion and further having a substantially gourd-shaped cross section, the unit further including a supporting shaft arranged lengthwise on an optical disc drive unit body, the support shaft configured to engage with and support the upper and lower extension portions of the rubber damper.

However, the device according to the first patent document requires a spring and a rubber member within the damper mechanism and fixed by screws, increasing the number of parts in the damper mechanism and potentially increasing costs as well as leading to difficulties in assembly. Further, the mechanism according to the second and third patent documents may reduce the number of parts by, for example, forming the damper from rubber and fitting the chassis to the damper directly, the second and third patent documents both include a supporting shaft in addition to the damper. In addition, the second patent document describes a distinct collar coupled to the supporting body for the purpose of clamping and supporting the damper while the third patent document describes a separate pressing member configured to compress the damper. Accordingly, existing damper mechanisms tend to be both complex and expensive.

SUMMARY OF THE INVENTION

To that end, it is an object of the invention to provide a disc unit having a small number of parts and capable of effecting fitting operation with ease.

The disc unit according to one aspect of the invention comprises a body frame having an opening area, a holder fitted to the body frame such that the holder is moveable with respect to the body frame when so fitted, a chassis disposed within the opening area of the body frame and including a pickup mechanism mounted thereon, a rear holding interface for holding the chassis onto the body frame via a damper, and elastic members coupled to the holder via front holding interfaces such that the chassis is coupled to the holder via the elastic members. Each of the elastic members is a substantially cylindrical body having flange portions at the upper and lower end portions thereof, a pair of first fitting portions disposed adjacent to the inner sides of the flange portions, a pair of expansion portions characterized by larger diameters and disposed between the first fitting portions, and a second fitting portion characterized by a smaller diameter and disposed between the pair of expansion portions. The holder has a pair of supporting portions each provided with a holder interface formed to fit into the first fitting portions of each elastic member. The front holding interfaces of the chassis are formed on the front side end portions thereof and configured to fit into the second fitting portion of each of the elastic members.

The disc unit according to a second aspect of the invention defines the interval between the pair of first fitting portions of the elastic members such that this interval is smaller than the interval between a pair of supporting portions of the holder and thereby the elastic members are imparted with pressure and clamped between the supporting portions when the supporting portions are fitted into the first fitting portions.

The disc unit according to a third aspect of the invention imparts pressure on the side end portions of the chassis when such side end portions are brought into contact with and clamped via the front holding interfaces within the second fitting portions disposed between the pair of expansion portions of the elastic members.

Per the configurations set forth above, the elastic members may be fitted into the holder and thus fitted to the body frame via the pair of first fitting portions and the elastic member may be fitted into the front holding interfaces of the chassis via the second fitting portions. Accordingly, fixing members such as screws and the like may be omitted. That is, since the first fitting portions are regions characterized by smaller diameter disposed between the flange portions and the expansion portions, the supporting portions of the holder are clamped by the flange portions and the expansion portions when fitted into such regions and held firmly thereby. Further, since the elastic members are fitted into the holder at multiple points, rotation of the holder about the connection between the elastic member and the holder is reduced. Still further, since the second fitting portions are defined by a region of smaller diameter disposed between the expansion portions, when the front holding interfaces of the chassis are fitted into the second fitting portion, the front holding interfaces are clamped by the expansion portions and firmly held thereby.

In addition, the elastic members may be imparted with pressure by defining the interval between the pair of first fitting portions such that this interval is smaller or larger than the corresponding interval between the pair of supporting portions of the holder; in this way the elastic members may be firmly held by the holder. This relationship may also cause the pair of expansion portions to be deformed and hold more firmly in place the chassis when the front holding interfaces of the chassis are fitted into the second fitting portions.

PREFERRED EMBODIMENT OF THE INVENTION

An embodiment of the invention is now described in detail. The working example described hereinafter is a preferred embodiment according to various aspects of the present invention and such example may imply limitations as to one or more such aspect. This working example is illustrative rather than exhaustive and the following disclosure should not be interpreted to limit the scope of the present invention unless expressly stated.

Figure 1:
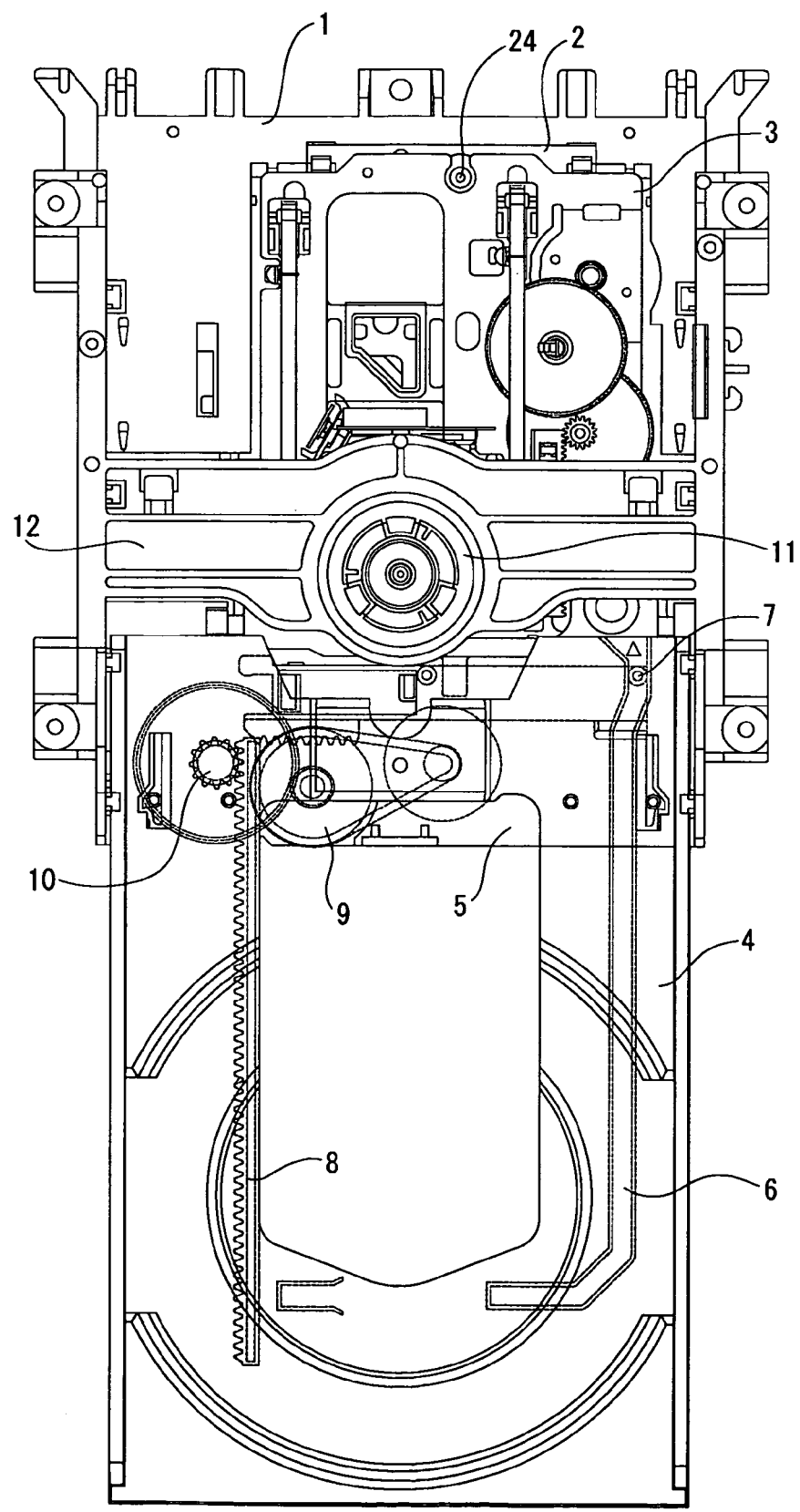
FIG. 1 is a schematic plan view showing an internal structure of a disc unit according to an embodiment of the invention.

FIG. 1 is a schematic plan view showing an internal structure of a disc unit according to an embodiment of the invention. An opening area 2 is formed by removing a portion of the bottom surface of a body frame 1. A chassis 3, described later, is formed inside the opening area 2. A front frame portion 5 for longitudinally guiding a tray 4 on which a disc is placed is disposed in front (lower side in FIG. 1) of the body frame 1, and the tray 4 is carried in or out from the body frame 1 when a sliding groove 6 disposed longitudinally on the lower surface of the tray 4 is fitted into a guiding projection 7 extending from the front frame portion 5. A tray rack 8 is disposed on the lower surface of the tray 4 in the longitudinal direction, wherein the tray rack 8 meshes a gear 10 which is rotated by a drive transmission mechanism 9 so as to control movement of the tray 4 in the longitudinal direction. An upper frame portion 12 for carrying a clamper 11 is extended on the body frame 1 over a carrying path of the tray 4.

Figure 2:
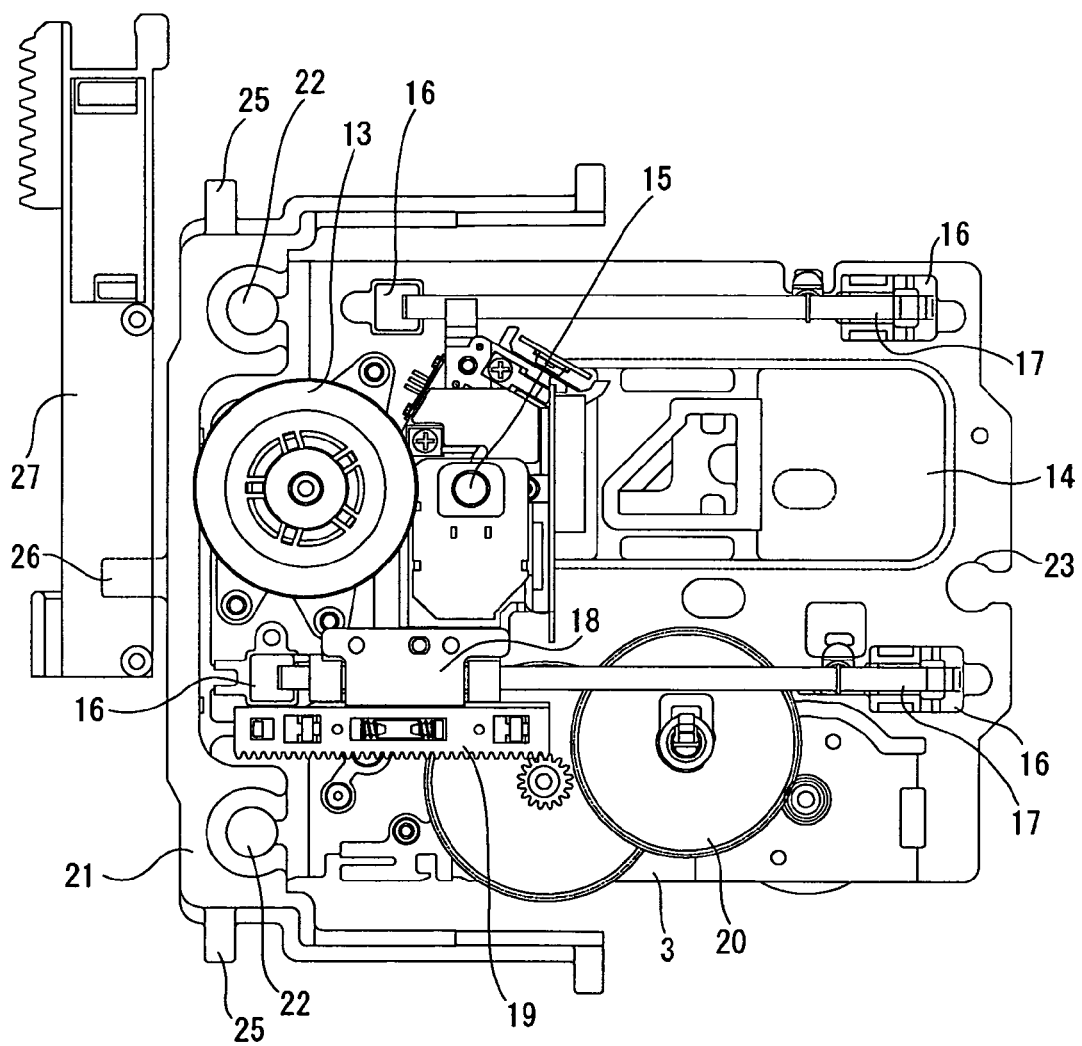
FIG. 2 is a schematic plan view showing a pickup mechanism as illustrated in FIG. 1.

FIG. 2 is a plan view showing a pickup mechanism mounted on the chassis 3. A turntable 13 coupled to a motor clamps and supports the disc. The turntable 13 is fixed to the chassis 3 and to a pickup unit 15 disposed in a rectangular opening area 14 formed in the central portion of the chassis 3. The damper 11 carried by the upper frame 12 is disposed over the turntable 13. The pickup unit 15 is slidably fitted into a pair of stick-shaped guides 17 which are fixed to a supporting table 16 connected to the chassis 3. The pickup unit 15 moves in the radial direction of the disc loaded on the turntable 13 so as to read out information stored in the disc.

A base table 18 is fixed to one side portion of the pickup unit 15 and the pickup unit 15 is conveyed to and positioned at a reading position when the base table 18 is moved by a rack/pinion mechanism 19. The rack/pinion mechanism 19 is driven by a drive transmission mechanism 20.

The front side end portion of the chassis 3 is fitted via two elastic members 22 to a holder 21 which is disposed to be movable vertically with respect to the plane of the body frame 1 at the side portion of the opening area 2 of the body frame 1. A rear holding interface 23, like a notch, is formed at the rear side end portion of the chassis 3 and fitted to the body frame 1 by way of a damper 24.

The damper 24 has engaging projections 25 which are projected at right and left end portions thereof, and the engaging projections 25 are fitted in longitudinal sliding grooves formed in the body frame 1. An engaging boss 26 projects from a front side of the holder 21. The engaging boss 26 is retained by cam grooves formed on both sides a slider 27. By virtue of the interface between the engaging boss 26 and the slider 27, the holder 21 is moved vertically up and down with respect to the plane of the body frame 1 in response to movements of the slider 27.

The slider 27 is engaged to drive the holder 21 when the tray 4 is carried in or out so as to allow the chassis 3 to be lowered with respect to the plane of the body frame 1. When so lowered, the damper 11 and the turntable 13 are positioned remotely from each other, which renders the disc in position to be moved within the plane of the tray 4.

Figure 3:
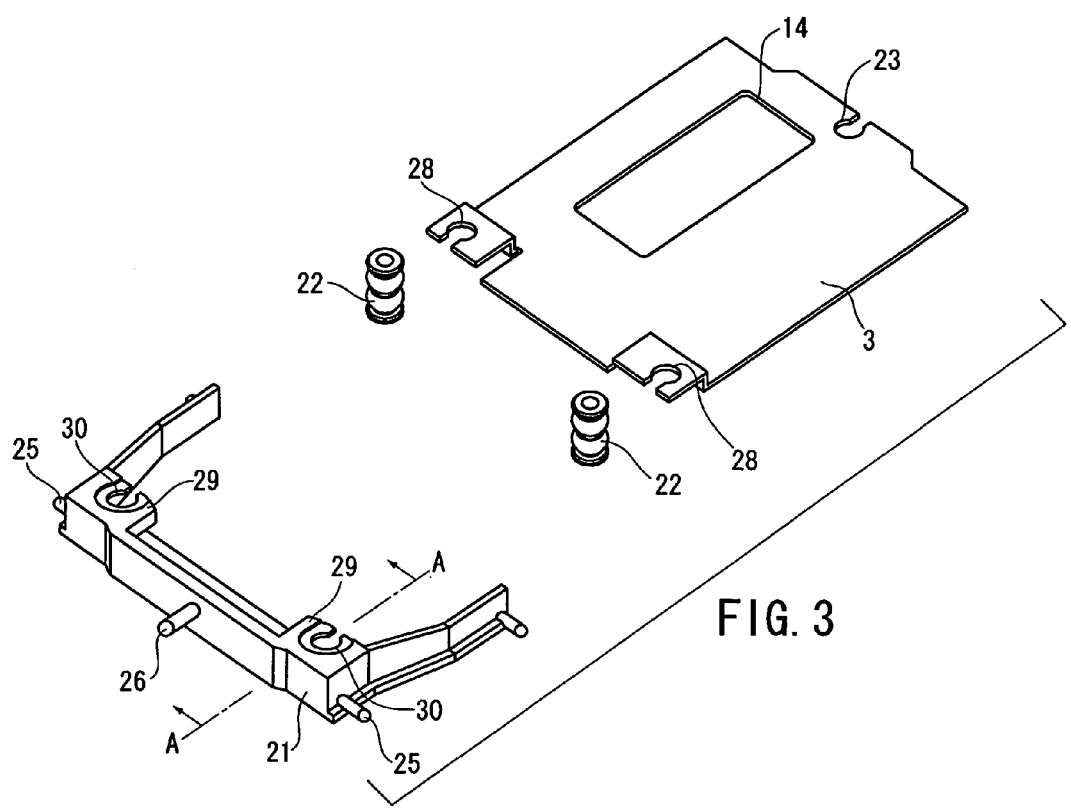
FIG. 3 is an exploded perspective view showing a chassis and a holder.
Figure 4:
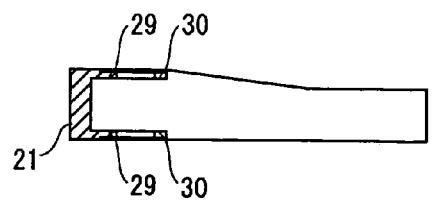
FIG. 4 is a sectional view of the holder taken along A-A in FIG. 3.

FIG. 3 is an exploded perspective view of the relationship between the chassis 3 and the holder 21. FIG. 3 omits parts of a pickup mechanism so as to facilitate the explanation. The chassis 3 includes front holding interfaces 28, such as notches, into which the elastic members 22 are fitted. The holder 21 has supporting portions 29 which extend therefrom and the supporting portions 29 have holder interfaces 30, like notches, into which the elastic members 22 are fitted. FIG. 4 is a sectional view of the holder 21 taken along A-A in FIG. 3. As shown in FIG. 4, the supporting portions 29 are extended from the upper end portion and the lower end portion of the holder 21.

Figure 5:
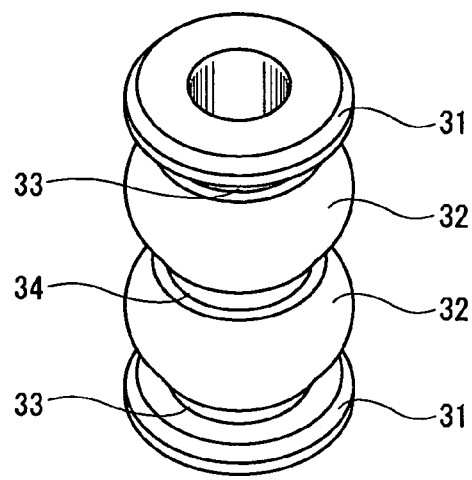
FIG. 5 is a perspective view of an elastic member.
Figure 6:
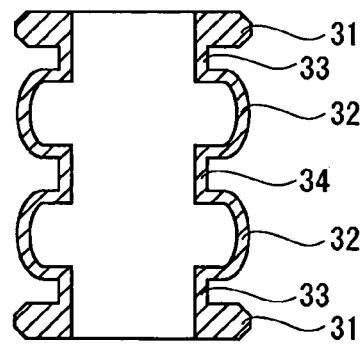
FIG. 6 is a sectional view of the elastic member.
Figure 7:
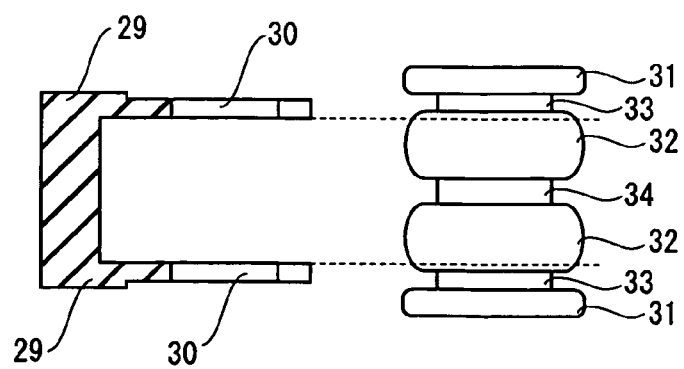
FIG. 7 is a view displaying fitting of the elastic member to supporting portions of the holder.

As shown in a perspective view in FIG. 5 and a sectional view in FIG. 6, the elastic member 22 is formed of a rubber material in a cylindrical shape, and has flange portions 31 at the upper and lower end portions. A pair of first fitting portions 33 defined by a region of smaller diameter are disposed at the inner sides of the flange portions 31. A pair of expansion portions 32 defined by a larger diameter are disposed adjacent to the first fitting portions 33, and a second fitting portion 34 having a smaller diameter is formed between the pair of expansion portions 32. The holder interfaces 30 of the pair of supporting portions 29 are fitted into the pair of first fitting portions 33, and the front holding interfaces 28 of the chassis 3 are fitted into the second fitting portion 34. As shown in FIG. 7, since an interval between the first fitting portions 33 is set slightly larger than the interval between the holder interfaces 30, when the elastic members 22 are fitted in the pair of supporting portions 29 of the holder 21, the pair of expansion portions 32 are pressed toward the second fitting portion 34. Accordingly, the elastic members 22 are brought into pressure through clamping of the expansion portions 32 against the pair of supporting portions 29. Further, the flange portions 31 and the expansion portions 32 are brought into contact with the supporting portions 29 from above and below, respectively, such that the elastic elements 22 are firmly held by the holder 21.

Figure 8A:
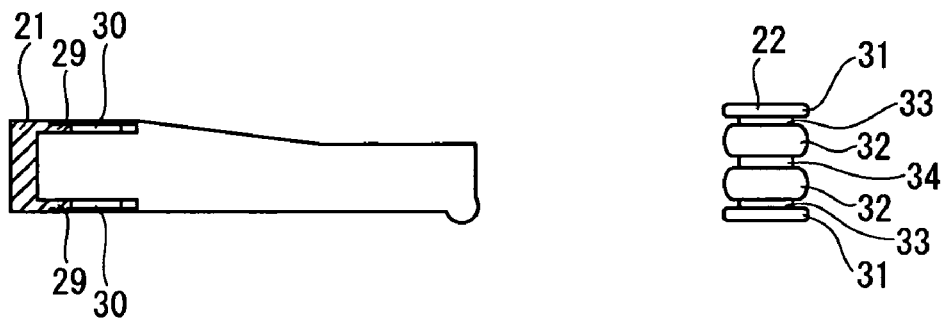
FIGS. 8(A) to 8(C) are views illustrating the steps for fitting the elastic member to the chassis and to the holder.
Figure 8B:
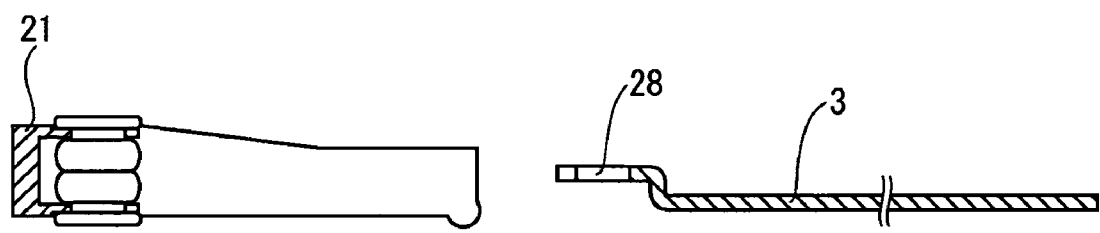
Figure 8C:
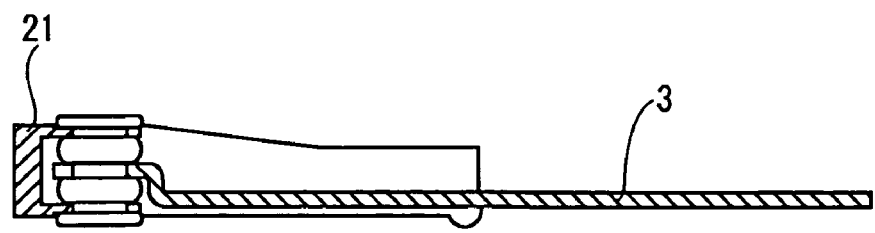

FIG. 8 is a view for illustrating the steps for fitting the elastic member 22 to the chassis 3 and to the holder 21. Although FIGS. 8(A) to 8(C) show one elastic member 22, both elastic members 22 are always fitted to the holder 21 at the same time. As shown in FIG. 8(A), the elastic member 22 is inserted into the holder 21 from the extension direction of the supporting portions 29. When the elastic member 22 is inserted into the supporting portions 29 to fit the first fitting portions 33 in the holding interfaces 30 of the holder 21, the expansion portions 32 are compressed by the supporting portions 29 so as to compress the second fitting portion 34 (FIG. 8(B)). Then, the front holding interfaces 28 of the chassis 3 are fitted into the respective compressed second fitting portions 34 such that the front holding interfaces 28 are compressed and clamped between the pair of expansion portions 32 (FIG. 8(C)).

As mentioned above, when the elastic members 22 and the chassis 3 are inserted into the holder 21, the chassis 3 can be firmly retained by the holder 21, thereby simplifying the fitting operation compared with systems involving additional fasteners.

Figure 9A:
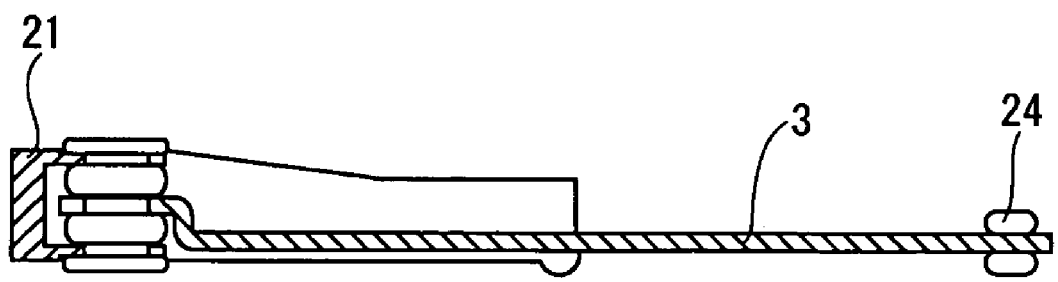
FIGS. 9(A) to 9(B) are views describing the operating state of the chassis and the holder.
Figure 9B:
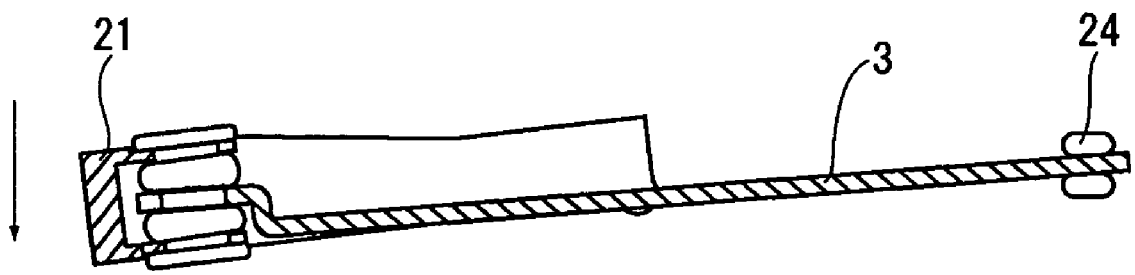

FIG. 9 is a view describing an operating state in which the holder 21 is rotated about the damper 24 in a direction substantially normal to the surface of the holder 21. Specifically, FIG. 9(B) shows a configuration in which the holder 21 is in a downwardly rotated position, as indicated by the arrow, with respect to the configuration in FIG. 9(A). When the holder 21 is in a upwardly moved position as in FIG. 9(A), the front holding interfaces 28 of the chassis 3 are fitted in the respective second fitting portions 34 such that the chassis 3 is substantially parallel to the supporting portions 29 of the holder 21. By contrast, when the holder 21 is moved downward, the chassis 3 rotates downward about the damper 24, rendering the chassis 3 in an inclined state with respect to the plane of the body frame 1. When the chassis 3 is so inclined, the front holding interfaces 28 of the chassis 3 and the supporting portions 29 of the holder 21 are no longer parallel and the pair of expansion portions 32 are deformed so as to maintain pressure against and clamp the chassis 3.

Since the front holding interfaces 28 of the chassis 3 maintain pressure with and are clamped by the expansion portions 32, even if the chassis 3 is rotated about the damper 24, the connection between the chassis 3 and the elastic member 22 is maintained. Such an operation and effect may be achieved by virtue of the interaction of several aspects of the present invention. For example, the elastic members 22 have flange portions 31 at the upper and lower portions as well as integrally formed first fitting 33 and expansion portions 32 which serve to maintain the interface between the expansion portions 32 to the supporting portions 29 of the holder 21. As another example, by virtue of the front holding interfaces 28 of the chassis 3 being compressed by and clamped to the expansion portions 32 of the elastic members 22, the disposition of chassis 3 with respect to the elastic member 22 is maintained.

Figure 10:
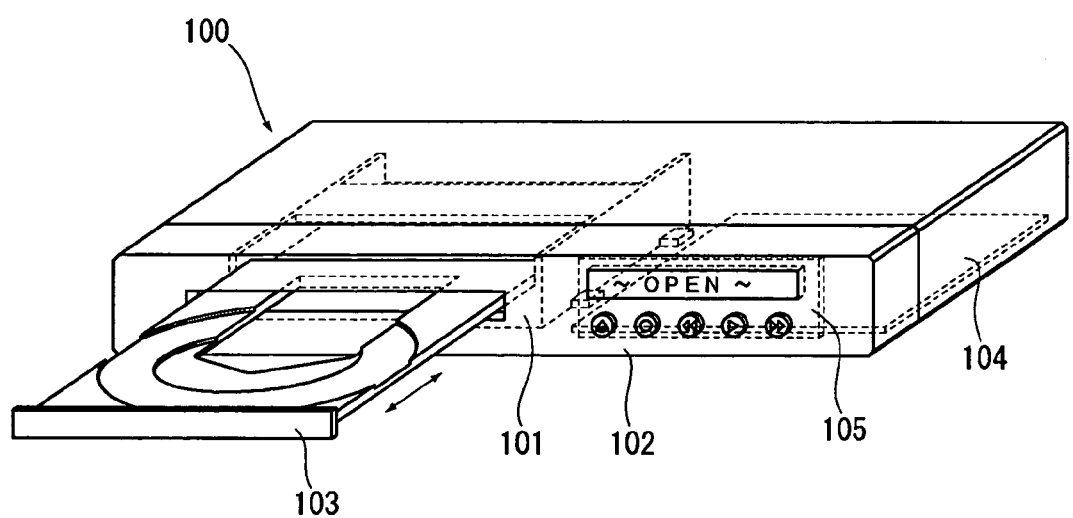
FIG. 10 is a perspective view showing of a picture reproducer with a built-in disc unit according to the present invention.

FIG. 10 shows a picture reproducer 100 serving as electronic equipment with a built-in disc unit of the invention described above. A disc unit 101 is included in a housing of the picture reproducer 100, and a tray 103 is fed out from and fed into an opening provided in a front panel 102. A main control substrate 104 is disposed adjacent to the disc unit 101, and a display substrate 105 is fitted to the front face side of the main control substrate 104. A display panel is exposed on the opening of the front panel 102 and operation buttons are disposed under this opening.

When the operation buttons are operated, the tray 103 of the disc unit 101 is fed out, and a storage disc is placed on the tray 103 which is subsequently fed in the disc unit 101. Then, as mentioned above, the chassis 3 in the disc unit 101 is moved upward and downward, so that the storage disc is clamped between the turntable and the clamper.

Since the chassis 3 is supported by the elastic members 22 as described above, the assembly provides improved vibration dampening, thereby forming a picture reproducer having high safety.

The disclosure of Japanese Patent Application No. 2004-073934 including the specification, claims, and drawings, is incorporated by reference.

What is claimed is:

1. A disc unit comprising a body frame having an opening area inside thereof, a holder fitted to the body frame and movable up and down with respect to the plane of the body frame, a chassis disposed inside the opening area and mounting a pickup mechanism thereon, a rear holding interface for holding the side end portions of the chassis at the rear side onto the body frame via a damper, and elastic members disposed opposite the rear holding interface for holding the side end portions of the chassis onto the holder, wherein the elastic members cause the chassis to move up and down with respect to the plane of the body frame in response to like movements of the holder;

each of the elastic members is formed of a cylindrical body having a pair of flange portions at the upper and lower end portions thereof, a pair of first fitting portions having a small diameter formed adjacent to the inner side of the flange portions, a pair of expansion portions having a large diameter formed between the first fitting portions, a second fitting portion having a small diameter formed between the pair of expansion portions;

and the holder has a pair of supporting portions each provided with a holder interface formed to fit into the first fitting portions of the elastic members, and the chassis has front holding interfaces formed on the side end portions thereof to fit into the second fitting portion of the elastic members.

2. A disc unit according to claim 1, wherein an interval between the pair of first fitting portions of the elastic members is set to be slightly larger than an interval between the pair of supporting portions of the holder, and the elastic members are brought into pressure contact with and clamped between the supporting portions when the supporting portions are fitted in the first fitting portions.

3. A disc unit according to claim 2, wherein the side end portions of the chassis are brought into pressure contact with and clamped between the pair of expansion portions when the front holding interfaces of the chassis are fitted in each second fitting portion of the elastic members.

4. Electronic equipment provided with the disc unit according to claim 1.

* * * * *